US009170927B1

(12) United States Patent
Kuhl et al.

(10) Patent No.: US 9,170,927 B1
(45) Date of Patent: Oct. 27, 2015

(54) AUTOMATIC TESTING A SOFTWARE PRODUCT COMPRISING A PLURALITY OF SOFTWARE PACKAGES (71) Applicant: International Business Machines Corporation, Armonk, NY (US)

(72) Inventors: Fabian Kuhl, Wiesbaden (DE); Christian Mueller, Dichtelbach (DE); Eirini Petraki, Mainz (DE); Markus Zellner, Baudenbach (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/658,545

(22) Filed: Mar. 16, 2015

(30) Foreign Application Priority Data

Apr. 3, 2014 (GB) .................................. 1405999.2

(51) Int. Cl.
*G06F 9/44* (2006.01)
*G06F 11/36* (2006.01)
*G06F 9/445* (2006.01)

(52) U.S. Cl.
CPC .............. *G06F 11/3684* (2013.01); *G06F 8/61* (2013.01); *G06F 8/62* (2013.01); *G06F 11/3664* (2013.01)

(58) Field of Classification Search
CPC .......... G06F 11/3688; G06F 8/61; G06F 8/62
USPC .................................................. 717/124, 174
See application file for complete search history.

(56) References Cited

U.S. PATENT DOCUMENTS

| | | | |
|---|---|---|---|
| 5,721,824 A * | 2/1998 | Taylor ........................... | 709/203 |
| 6,681,391 B1 | 1/2004 | Marino et al. | |
| 7,904,892 B2 | 3/2011 | Babb, II et al. | |
| 2005/0132350 A1 * | 6/2005 | Markley et al. ............... | 717/168 |
| 2008/0127088 A1 * | 5/2008 | Harmsen et al. .............. | 717/121 |
| 2008/0201705 A1 * | 8/2008 | Wookey ......................... | 717/175 |
| 2009/0265690 A1 * | 10/2009 | Naslavsky et al. ............ | 717/126 |
| 2012/0030651 A1 | 2/2012 | Kemmler et al. | |

FOREIGN PATENT DOCUMENTS

EP 0802480 A1 10/1997

OTHER PUBLICATIONS

Search Report under Section 17(5) dated Oct. 24, 2014, Application No. GB1405999.2, 3 pages.

* cited by examiner

*Primary Examiner* — Li B Zhen
*Assistant Examiner* — Viva Miller
(74) *Attorney, Agent, or Firm* — Francis Lammes; Stephen J. Walder, Jr.; William J. Stock (57) ABSTRACT A mechanism is provided for automatic testing a software product comprising a plurality of software packages that are to be installed or de-installed in defined order. Software package dependency and prerequisite information is analyzed for each software package and a dependency abstraction level matrix is created for the software packages. The dependency abstraction level matrix is reduced by searching for software packages assigned to more than one abstraction level, determining the highest abstraction level the software package is assigned to, and deleting the software package from lower abstraction levels that the software package is assigned to. Possible software package test combinations of the software product are determined based on the reduced dependency abstraction level matrix. An installation or de-installation procedure of software packages is performed based on the software package test combinations to test installation or de-installation order of the software packages.

18 Claims, 6 Drawing Sheets

| | L1 | L2 | L3 | L4 |
|---|---|---|---|---|
| BL0 | P1+P2 / P2+P1 | P3 / P4 | P5 / P6 | P7 / P8 |
| BL1 | P1 | P3+P4 / P4+P3 | P5 / P6 | P7 / P8 |
| | P2 | P3+P4 / P4+P3 | P5 / P6 | P7 / P8 |
| | P1+P2 | P3+P4 / P4+P3 | P5 / P6 | P7 / P8 |
| BL2 | P1+P2 | P3 | P5+P6 / P6+P5 | P7 / P8 |
| | P1+P2 | P4 | P5+P6 / P6+P5 | P7 / P8 |
| | P1+P2 | P3+P4 | P5+P6 / P6+P5 | P7 / P8 |
| BL3 | P1+P2 | P3+P4 | P5 | P7+P8 / P8+P7 |
| | P1+P2 | P3+P4 | P6 | P7+P8 / P8+P7 |
| | P1+P2 | P3+P4 | P5+P6 | P7+P8 / P8+P7 |
| BL4 | P1+P2 | P3+P4 | P5+P6 | P7+P8 |

FIG. 10

| | L1 | L2 | L3 | L4 |
|---|---|---|---|---|
| BL4 | P1 / P2 | P3 / P4 | P5 / P6 | P7+P8 / P8+P7 |
| BL3 | P1 / P2 | P3 / P4 | P5+P6 / P6+P5 | |
| BL2 | P1 / P2 | P3+P4 / P4+P3 | | |
| BL1 | P1+P2 / P2+P1 | | | |
| BL0 | | | | |

AUTOMATIC TESTING A SOFTWARE PRODUCT COMPRISING A PLURALITY OF SOFTWARE PACKAGES

BACKGROUND

The present invention relates in general to the field of software product testing, and in particular to a method for automatic testing a software product comprising a plurality of software packages, and a corresponding test environment for automatic testing a software product comprising a plurality of software packages. Still more particularly, the present invention relates to a data processing program and a computer program product for automatic testing a software product comprising a plurality of software packages.

Software products consist generally of several software packages. Some of those packages are used for core functionality of this software product and some of them are optional. Each installation of a new package (mandatory or not) can possibly have influence on already installed packages, for example, through creation of links or through creating of new files or directories in already existing directories, etc. To be sure that a software product is working properly it is important to follow a specific procedure during installation.

To protect the users against wrong installation, the software vendors furnish each package of a software product with installation prerequisites against the other packages inside this software product. This happens during the packaging process as a part of software development. All files needed for a program are combined in such a package. Among other things—like version—the builder specifies also the prerequisites of this software package.

Before the product gets to a customer, it is necessary to test the outcome of the build and packaging process. It is a four-eye principle. A properly developed software product should be able to get installed correctly and should be fully operational afterwards. If there is the need to uninstall a product, this should be possible in a proper way. This should be tested during the installation verification test (IVT). During this installation verification test (IVT), also the dependencies of the product should be verified and tested.

During the installation verification test (IVT) it is important to install or uninstall the software packages of any software product in a certain order, as recommended in the manual. If the dependencies of the packages have been set correctly, the software installation process should be canceled with a helpful error, when a customer is trying to install the packages in the wrong order. Same is true for the dependencies of the packages during uninstallation. The uninstallation routine should also quit with a helpful error, in case of an incorrect order.

There are usually six to eight software packages in one software product. It is not desirable to use a method that calculates all theoretically possible combinations of the package. For eight software packages, for example, there are already 40320 possible combinations, only for the installation on one platform. This number of combinations will rise also for the removal on one platform. Test should try a number of possible combinations of installing and uninstalling. So with every change in the packaging, test needs to retry and change also the combinations of installing and uninstalling tests. Changes of the packaging can occur during every release or program temporary fix (PTF) several times. This leads to massive testing efforts during the installation verification test (IVT).

SUMMARY

In one illustrative embodiment, a method, in a data processing system, is provided for automatic testing a software product comprising a plurality of software packages that are to be installed or de-installed in defined order. The illustrative embodiment provides software package dependency and prerequisite information for the software product. The illustrative embodiment analyzes the software package dependency and prerequisite information for each software package in the plurality of software packages and creates a dependency abstraction level matrix for the plurality of software packages with at least one row representing one abstraction level. The illustrative embodiment assigns each software package in the plurality of software packages to at least one abstraction level based on the software package's dependencies to other software packages in the plurality of software packages. In the illustrative embodiment, in the dependency abstraction level matrix, each abstraction level contains software packages that have no dependencies amongst themselves and depend on at least one other software package assigned to a previous abstraction level. In the illustrative embodiment, a lowest abstraction level contains software packages without any dependencies. The illustrative embodiment reduces the dependency abstraction level matrix by searching for software packages assigned to more than one abstraction level, determining a highest abstraction level the software package is assigned to, and deleting the software package from lower abstraction levels that the software package is assigned to. The illustrative embodiment determines possible software package test combinations of the software product based on the reduced dependency abstraction level matrix. The illustrative embodiment performs an installation procedure or de-installation procedure of the plurality of software packages of the software product on a computing device based on the software package test combinations to test installation or de-installation order of the plurality of software packages of the software product.

In yet another embodiment of the present invention, a computer program product comprising a computer-usable or computer-readable medium having a computer-readable program is provided. The computer readable program, when executed on a computing device, causes a computer to perform a method for automatic testing a software product comprising a plurality of software packages when the program is run on the computer.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

The above, as well as additional purposes, features, and advantages of the present invention will become apparent in the following detailed written description.

BRIEF DESCRIPTION OF THE DRAWINGS

A preferred embodiment of the present invention, as described in detail below, is shown in the drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
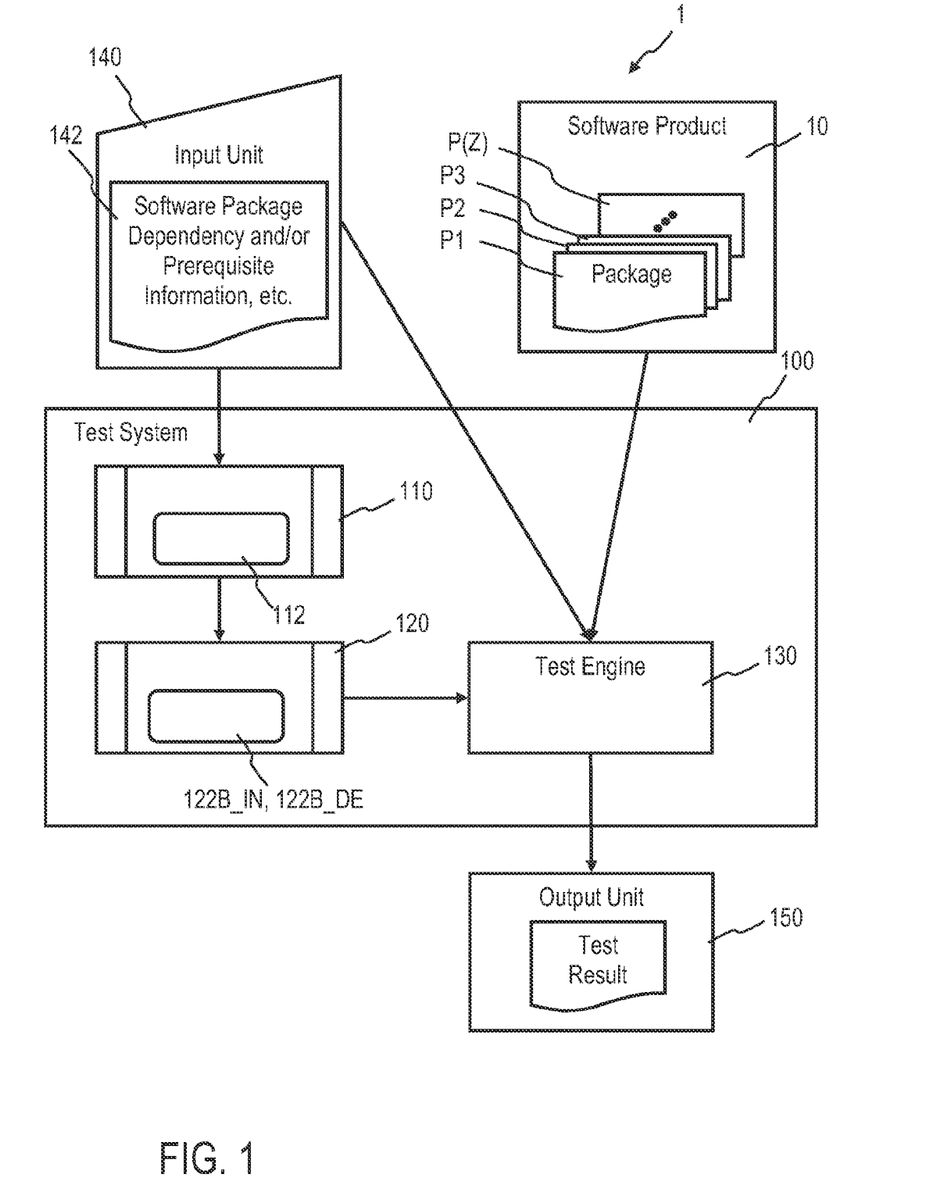
FIG. 1 is a schematic block diagram of a test environment for automatic testing a software product, in accordance with an embodiment of the present invention.
Figure 2:
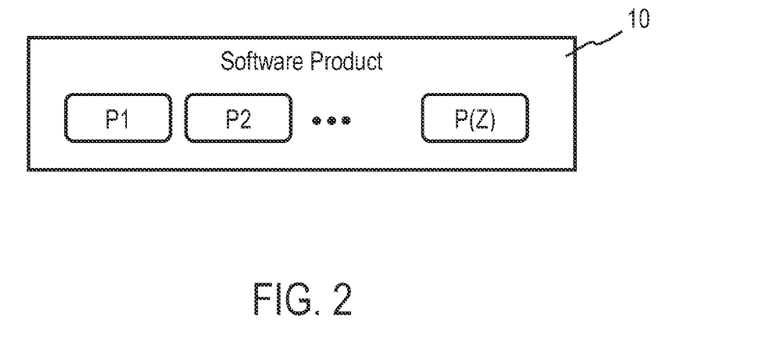
FIG. 2 is a schematic block diagram of a generic software product to be tested comprising a plurality of software packages.

FIG. 1 shows a test environment 1 for automatic testing a software product 10, in accordance with an embodiment of the present invention; FIG. 2 shows a generic software product 10 to be tested comprising a plurality of software packages P1 to P(Z); and FIG. 3 shows a generic dependency abstraction level matrix 112 based on the generic software product 10 to be tested of FIG. 2.

Figure 3:
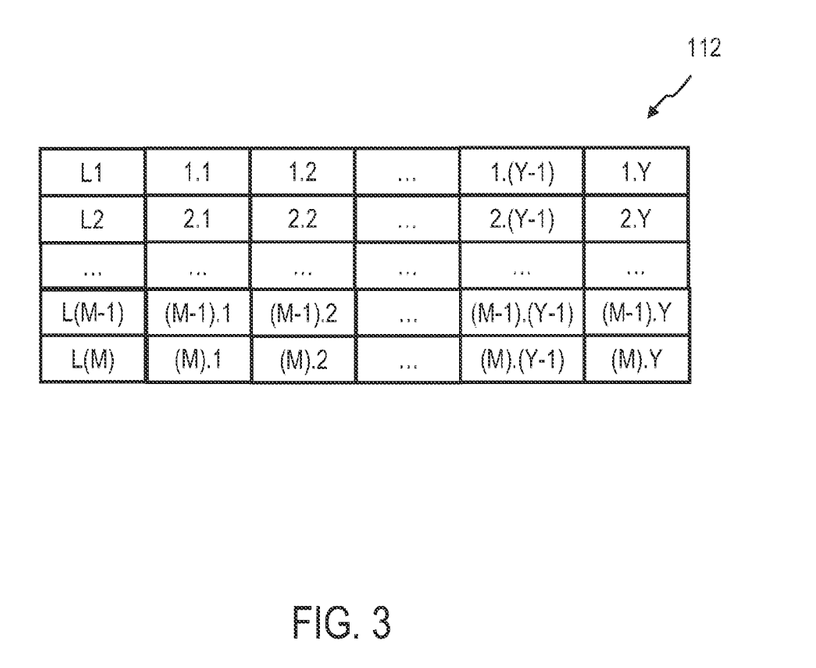
FIG. 3 is a schematic diagram of a generic dependency abstraction level matrix based on the generic software product to be tested of FIG. 2.

Referring to FIG. 1 to 3, the shown embodiment of the present invention employs a test environment 1 for automatic testing a software product 10 comprising a plurality of software packages P1 to P(Z), which are to be installed or de-installed in defined order. The test environment 1 comprises an input unit 140 providing software package dependency and prerequisite information 142 for the software product 10; a first test entity 110, a second test entity 120, a test engine 130, and an output unit 150 providing test results. In the shown embodiment the first test entity 110, the second test entity 120, and the test engine 130 are part of a test system 100. The first test entity 110 analyzes the software package dependency and prerequisite information 142 for each software package P1 to P(Z) of the software product 10. Further, the first test entity 110 creates a dependency abstraction level matrix 112 for the software packages P1 to P(Z)) of the software product 10 with at least one row representing one abstraction level L1 to L(M), and assigns each software package P1 to P(Z) of the software product 10 to at least one abstraction level L1 to L(M) based on its dependencies to other software packages P1 to P(Z).

The classification of a software package P1 to P(Z) to an abstraction level L1 to L(M) is set by its dependency to other software packages P1 to P(Z). So its abstraction level is higher than the abstraction level of its dependent software packages.

FIG. 3 shows this concept. Referring to FIG. 3, the shown generic dependency abstraction level matrix 112 comprises M abstraction levels L1 to L(M), i.e. M rows, and (Y+1) columns, wherein in a first column the abstraction levels L1 to L(M) are listed. The number Y represents a maximum number of software packages P1 to P(Z) in the corresponding abstraction level L1 to L(M). In FIG. 3 fields of the generic dependency abstraction level matrix 112 the software packages P1 to P(Z) can be placed in according to their dependencies are denoted with (K.H), with K representing the number (1 to M) of the corresponding abstraction level L1 to L(M), i.e. the row, and H representing a position number (1 to Y) of the software package P1 to P(Z) inside the corresponding abstraction level L1 to L(M).

Software packages P1 to P(Z) without any dependencies are assigned to the lowest abstraction level L1 and placed in the fields (1.1) to (1.Y) with Y representing the maximum number of software packages P1 to P(Z) inside the first abstraction level L1. Software packages P1 to P(Z) of the same abstraction level L1 to L(M) have no dependencies to each other. In the shown embodiment the first test entity 110 divides the software packages P1 to P(Z) of the software product 10 in M abstraction levels L1 to L(M). On each abstraction level L1 to L(M) at least one software package P1 to P(Z) and a maximum of Y software packages P1 to P(Z) exists. All software packages in the lowest abstraction level L1 placed in the fields (1.1) to (1.Y) have no dependencies to other software packages, so these software packages can be installed without any conditions. If no dependencies exist, all software packages P1 to P(Z) are placed in the lowest abstraction level L1. The software packages of a subsequent abstraction level L2 placed in the fields (2.1) to (2.Y) have dependencies only to the software packages in the fields (1.1) to (1.Y) of the lowest abstraction level L1. The software packages in the fields (3.1) to (3.Y) of the next abstraction level L3 have dependencies only to software packages in the fields (2.1) to (2.Y) in the preceding abstraction level L2 etc.

For further processing the first test entity 110 reduces the dependency abstraction level matrix 112 by searching for software packages assigned to more than one abstraction level; determining the highest abstraction level the software package is assigned to, and deleting the software package from lower abstraction levels it is assigned to. In the dependency abstraction level matrix 112 each abstraction level L1 to L(M) contains software packages, which have no dependencies amongst themselves. Further, software packages in an abstraction level L(N+1) depend on at least one other software package of a preceding abstraction level L(N). A lowest abstraction level L1 contains software packages without any dependencies. During installation of the software product 10, it is only possible to install software packages assigned to an abstraction level L(N+1) if all software packages assigned to lower abstraction levels L1 to L(N) are already installed. During uninstallation of the software product 10, it is only possible to remove software packages assigned to an abstraction level L(N) if all software packages assigned to higher abstraction levels L(N+1) to L(M) are already removed.

The second test entity 120 determines possible software package test combinations of the software product 10 based on the reduced dependency abstraction level matrix 112, such as an installation basis level matrix 122B_IN based on the reduced dependency abstraction level matrix 112 and a de-installation basis level matrix 122B_DE based on the reduced dependency abstraction level matrix 112, which are discussed in detail below. The test engine 130 installs or de-installs software packages P1 to P(Z) of the software product 10 based on the software package test combinations to test installation or de-installation order of the software packages P1 to P(Z) of the software product 10.

To test an installation order of the software packages P1 to P(Z) of the software product 10, the second test entity 120 creates an installation basis level matrix comprising rows and columns based on the abstraction level matrix 112. To test a de-installation order of the software packages P1 to P(Z) of the software product 10, the second test entity 120 creates a de-installation basis level matrix comprising rows and columns based on the abstraction level matrix 112.

The installation basis level matrix or the de-installation basis level matrix created by the second test entity 120 are based on the abstraction of the dependencies created by the first test entity 110 and allow systematic testing of all possible software package dependency combinations for a software product 10 with a reduced test effort.

The second test entity 120 starts with the definition of base levels. These base levels determinate the installation or de-installation state of the software product 10 in the particular test cycle. Depending on the current base level the second test entity 120 decides based on the dependency abstraction level matrix 112 created by the first test entity 110, which software package dependency combinations should be tested to ensure that at the end of the automation all reasonable combinations are tested.

The dependencies as it should be for the software packages P1 to P(Z) of the software product 10 are stored in an xml file, for example. The test engine 130 goes through all from second test entity 120 proposed combinations and checks the results against the known software package dependency and prerequisite information 142. The result can be pass or fail.

Figure 4:
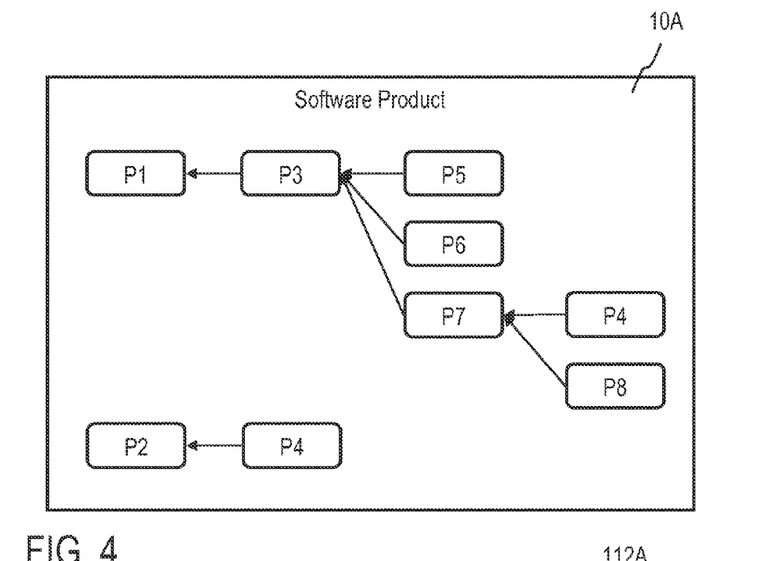
FIG. 4 is a schematic dependency diagram of a first exemplary software product to be tested comprising eight software packages.
Figure 5:
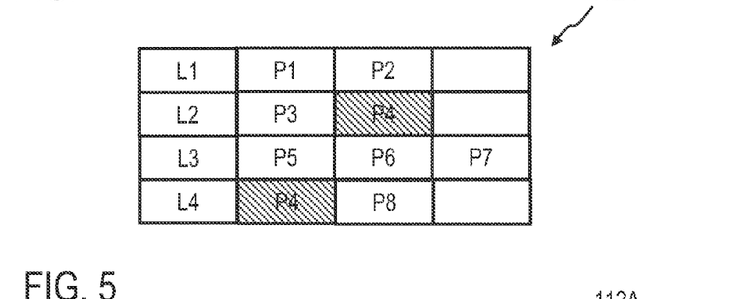
FIG. 5 is a schematic diagram of a dependency abstraction level matrix based on the first exemplary software product to be tested of FIG. 4, in accordance with an embodiment of the present invention.

FIG. 4 shows a first exemplary software product 10A to be tested comprising eight software packages P1 to P8; FIG. 5 shows a corresponding dependency abstraction level matrix 112A based on the first exemplary software product 1 OA to be tested of FIG. 4, in accordance with an embodiment of the present invention; and FIG. 6 shows a reduced dependency abstraction level matrix 112A based on the dependency abstraction level matrix 112A of FIG. 5.

Figure 6:
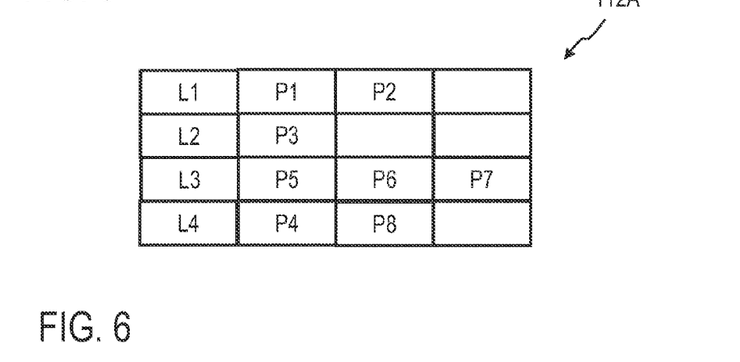
FIG. 6 is a schematic diagram of a reduced dependency abstraction level matrix based on the dependency abstraction level matrix of FIG. 5.

Referring to FIG. 4 to 6 the first test entity 110 creates the dependency abstraction level matrix 112A to reduce the amount of combinatorial tests for the software package dependencies of the first exemplary software product 10A to be tested. At the beginning the first test entity 110 determines the dependencies of each software package P1 to P8. In the first exemplary software product 10A first software package P1 and a second software package P2 have no dependencies. A third software package P3 depends on the first software package P1 and fourth software package P4 depends on the second software package P2 and a seventh software package P7. A fifth software package P5, a sixth software package P6 and the seventh software package P7 all depend on the third software package P3 and a eighth software package P8 depends on the seventh software package P7.

The creation of the abstract levels L1 to L4 of the exemplary dependency abstraction level matrix 112A is done by sequentially running through all declarations. All software packages without dependencies, i.e. software packages P1, P2, will be assigned to the lowest abstraction level, i.e. level L1. All other dependencies will be consequently resolved by putting a certain software package P(Y), which has a dependency to a software package P(X) in abstraction level L(N), into abstraction level L(N+1). For example, the third software package P3, which has a dependency to the first software package P1, will be put into the second abstraction level L2, as the first software package P1 is assigned to the first abstraction level L1. Processing will be done, until all dependencies have been resolved. Referring to FIG. 5 in the shown dependency abstraction level matrix 112A the first abstraction level L1 contains the first software package P1 and the second software package P2, the second abstraction level L2 contains the third software package P3 and the fourth software package P4, the third abstraction level L3 contains the fifth software package P5, the sixth software package P6 and the seventh software package P7, and the fourth abstraction level L4 contains the fourth software package P4 and the eight software package P8.

It is possible, that a software package P1 to P8 can have dependencies to more than one other software package. So if a software package has dependencies to software packages in different abstraction levels, according to the algorithm, this software package would be assigned to more than one abstraction level. For example, in the first exemplary software product 10A to be tested the fourth software package P4 has dependencies to the second software package P2 and the seventh software package P7. In this case a lower abstraction level dependency, here the second software package P2 from the first abstraction level L1, is covered by a higher abstraction level dependency, here the seventh software package P7 from the third abstraction level L3. The first test entity 110 deletes the fourth software package P4 from the lower abstraction level L2 and creates the reduced dependency abstraction level matrix 112A shown in FIG. 6. This ensures that each software package P1 to P8 of the first exemplary software product 10A to be tested is represented only once in the dependency abstraction level matrix 112A.

Referring to FIG. 6, the shown reduced dependency abstraction level matrix 112A comprises four abstraction levels L1 to L4 and four columns; wherein in a first column the abstraction levels L1 to L4 are listed. Referring to FIG. 6 in the shown reduced dependency abstraction level matrix 112A the first abstraction level L1 contains the first software package P1 and the second software package P2, the second abstraction level L2 contains the third software package P3, the third abstraction level L3 contains the fifth software package P5, the sixth software package P6 and the seventh software package P7, and the fourth abstraction level L4 contains the fourth software package P4 and the eighth software package P8. The maximum number of software packages in one abstraction level L1 to L4 is three, since the third abstraction level L3 comprises three software packages P5, P6, P7.

Figure 7:
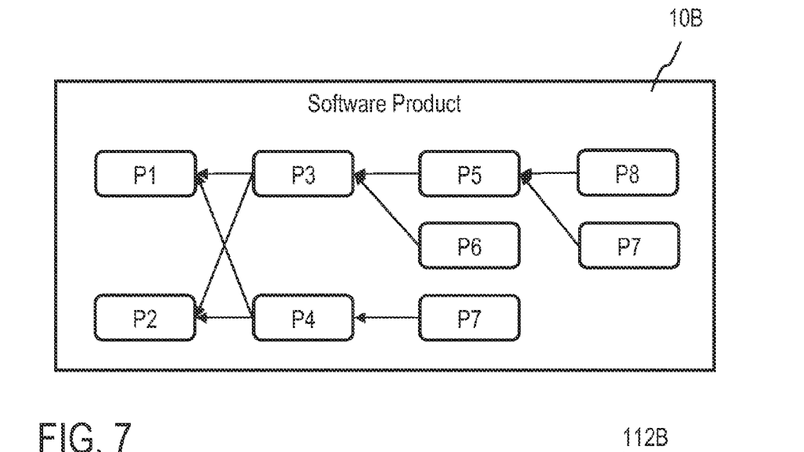
FIG. 7 is a schematic dependency diagram of a second exemplary software product to be tested comprising eight software packages.
Figure 8:
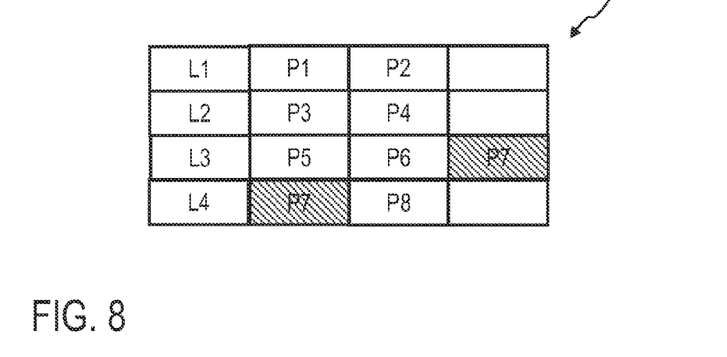
FIG. 8 is a schematic diagram of a dependency abstraction level matrix based on the second exemplary software product to be tested of FIG. 7, in accordance with an embodiment of the present invention.
Figure 9:
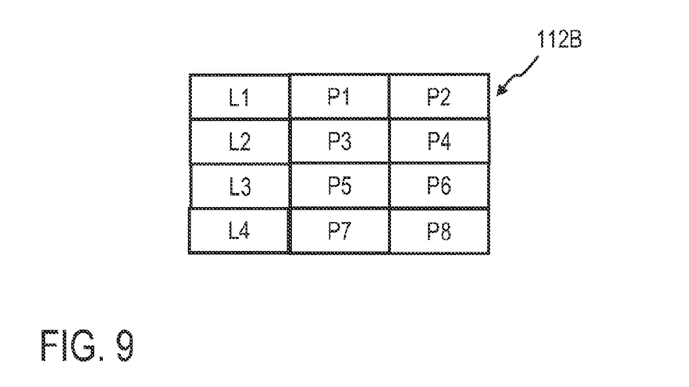
FIG. 9 is a schematic diagram of a reduced dependency abstraction level matrix based on the dependency abstraction level matrix of FIG. 8.
Figure 10:
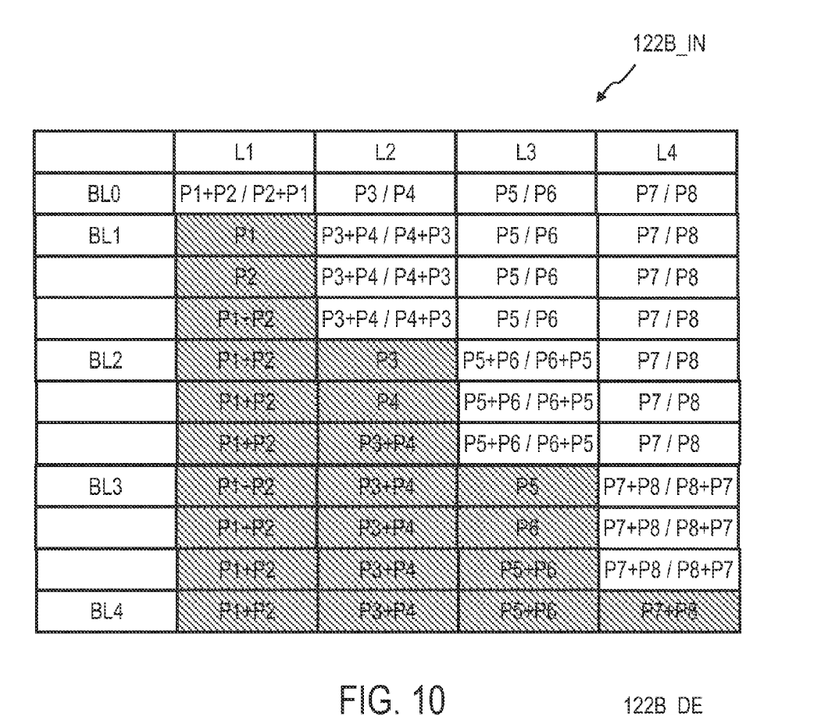
FIG. 10 is a schematic diagram of an installation basis level matrix based on the reduced dependency abstraction level matrix of FIG. 9, in accordance with an embodiment of the present invention.
Figure 11:
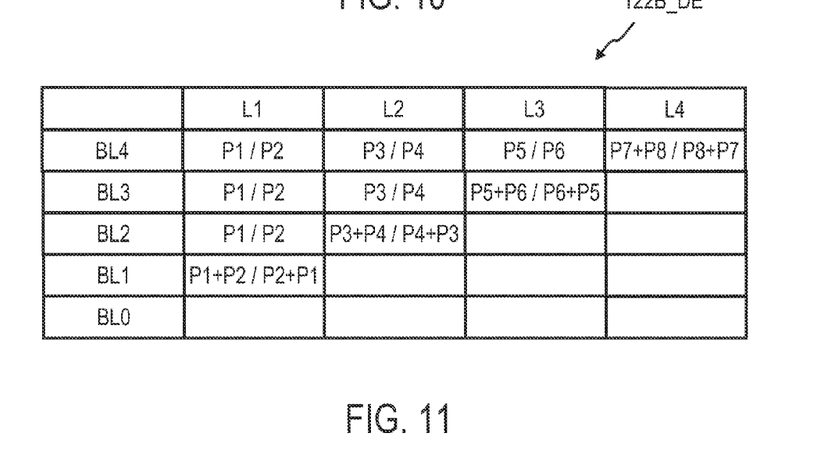
FIG. 11 is a schematic diagram of a de-installation basis level matrix based on the reduced dependency abstraction level matrix of FIG. 9, in accordance with an embodiment of the present invention.

FIG. 7 shows a second exemplary software product 10B to be tested comprising eight software packages P1 to P8; FIG. 8 shows a corresponding dependency abstraction level matrix 112B based on the second exemplary software product 10B to be tested of FIG. 7, in accordance with an embodiment of the present invention; FIG. 9 shows a reduced dependency abstraction level matrix 112B based on the dependency abstraction level matrix 112B of FIG. 8; FIG. 10 shows an installation basis level matrix 122B_IN based on the reduced dependency abstraction level matrix 112B of FIG. 9, in accordance with an embodiment of the present invention; and FIG. 11 shows a de-installation basis level matrix 122B_DE based on the reduced dependency abstraction level matrix 112B of FIG. 8, in accordance with an embodiment of the present invention.

Referring to FIG. 7 to 9 the first test entity 110 creates the dependency abstraction level matrix 112B to reduce the amount of combinatorial tests for the software package dependencies of the second exemplary software product 10B to be tested. At the beginning the first test entity 110 determines the dependencies of each software package P1 to P8. In the second exemplary software product 10B first software package P1 and a second software package P2 have no dependencies. A third software package P3 depends on the first software package P1 and on the second software package P2. A fourth software package P4 depends on the first software package P1 and on the second software package P2. A fifth software package P5 and a sixth software package P6 depend both on the third software package P3. A seventh software package P7 depends on the fourth software package P4 and on the fifth software package P8. An eighth software package P8 depends on the fifth software package P5.

The creation of the abstract levels L1 to L4 of the exemplary dependency abstraction level matrix 112B is done by sequentially running through all declarations. All software packages without dependencies, i.e. software packages P1, P2, will be assigned to the lowest abstraction level, i.e. level L1. All other dependencies will be consequently resolved by putting a certain software package P(Y), which has a dependency to a software package P(X) in abstraction level L(N), into abstraction level L(N+1). For example, the third software package P3, which has a dependency to the first software package P1 and the second software package P2, will be put into the second abstraction level L2, as the first software package P1 and the second software package P2 are assigned to the first abstraction level L1. Processing will be done, until all dependencies have been resolved. Referring to FIG. 8 in the shown dependency abstraction level matrix 112B the first abstraction level L1 contains the first software package P1 and the second software package P2, the second abstraction level L2 contains the third software package P3 and the fourth software package P4, the third abstraction level L3 contains the fifth software package P5, the sixth software package P6 and the seventh software package P7, and the fourth abstraction level L4 contains the seventh software package P7 and the eight software package P8.

In the second exemplary software product 10B to be tested the seventh software package P7 has dependencies to the fourth software package P4 and the fifth software package P5.

In this case a lower abstraction level dependency, here the fourth software package P4 from the second abstraction level L2, is covered by a higher abstraction level dependency, here the fifth software package P5 from the third abstraction level L3. The first test entity 110 deletes the seventh software package P7 from the lower abstraction level L3 and creates the reduced dependency abstraction level matrix 112B shown in FIG. 9. This ensures that each software package P1 to P8 of the second exemplary software product 10B to be tested is represented only once in the dependency abstraction level matrix 112B.

Referring to FIG. 9, the shown reduced dependency abstraction level matrix 112B comprises four abstraction levels L1 to L4 and three columns; wherein in a first column the abstraction levels L1 to L4 are listed. Referring to FIG. 9 in the shown reduced dependency abstraction level matrix 112B the first abstraction level L1 contains the first software package P1 and the second software package P2, the second abstraction level L2 contains the third software package P3 and the fourth software package P4, the third abstraction level L3 contains the fifth software package P5 and the sixth software package P6, and the fourth abstraction level L4 contains the seventh software package P7 and the eighth software package P8. The maximum number of software packages in one abstraction level L1 to L4 is two.

Referring to FIGS. 10 and 11 the logic of the test runs are explained in accordance with the second exemplary software product 10B. To allow systematic testing of all possible software package dependency combinations for the exemplary second software product installation or de-installation with a reduced test effort, the second test entity 120 determines the possible software package test combinations of the software product 10B based on the reduced dependency abstraction level matrix 112B of FIG. 9. The test engine 130 installs or de-installs software packages P1 to P8 of the software product 10B based on the software package test combinations to test installation or de-installation order of the software packages P1 to P8 of the software product 10B.

To test an installation order of the software packages P1 to P8 of the software product 10B, the second test entity 120 creates the installation basis level matrix 122B_IN comprising rows and columns based on the abstraction level matrix 112B. To test a de-installation order of the software packages P1 to P8 of the software product 10B, the second test entity 120 creates the de-installation basis level matrix 122B_DE comprising rows and columns based on the abstraction level matrix 112B.

Referring to FIG. 10 the installation basis level matrix 122B_IN comprises one column for each abstraction level L1 to L4 (L(M)) and one row for the lowest base level BL0 and the highest base level BL4 (BL(M)). The numbers of rows of subsequent base levels BL1 to BL3 are defined by possible permutation of the software packages of a corresponding abstraction level L1 to L4. Since all abstractions level L1 to L4 comprise two software packages the base levels BL1 to BL3 each comprise three rows. The rows represent different software package test combinations.

The second test entity 120 starts with the definition of base levels BL0 to BL(M) with M representing the number of abstraction levels L1 to L(M). Depending on the current base level BL(N) with N={0 to M} the second test entity 120 decides based on the dependency abstraction level matrix 112B created by the first test entity 110, which software package dependency combinations should be tested to ensure that at the end of the automation all reasonable combinations are tested. Since the dependency abstraction level matrix 112B comprises four abstraction levels L1 to L4, the second test entity 120 defines base levels BL0 to BL4. These base levels BL0 to BL4 determinate the installation or de-installation state of the software product 10B in the particular test cycle. In FIG. 10 the dashed fields represent installed software packages of the software product 10B to be tested.

Referring to FIG. 10, in a lowest or first basis level BL0 no software packages P1 to P8 of the software product 10B are installed. In a second basis level BL1 at least one software package P1, P2 of the lowest or first abstraction level L1 is installed. So in a first row of the second basis level BL the first software package P1 is installed, in a second row of the second basis level BL the second software package P2 is installed, and in a third row of the second basis level BL the first software package P1 and the second software package P2 both are installed. In a third basis level BL2 all software packages P1, P2 from the lowest or first abstraction level L1 and at least one software package P3, P4 of the second abstraction level L2 are installed. So in a first row of the third basis level BL2 the first software package P1, the second software package P2, and the third software package P3 are installed, in a second row of the third basis level BL2 the first software package P1, the second software package P2, and the fourth software package P4 are installed, and in a third row of the third basis level BL2 the first software package P1, the second software package P2, the third software package P3 and the fourth software package P4 are installed. In a fourth basis level BL3 all software packages P1. P2 from the lowest or first abstraction level L1 and all software packages P3, P4 from the second abstraction level L2 and at least one software package P5, P6 of the third abstraction level L3 are installed. So in a first row of the third basis level BL2 the first software package P1, the second software package P2, the third software package P3, the fourth software package P4, and the fifth software package P5 are installed, in a second row of the fourth basis level BL3 the first software package P1, the second software package P2, the third software package P3, the fourth software package P4, and the sixth software package P6 are installed, and in a third row of the fourth basis level BL3 the first software package P1, the second software package P2, the third software package P3, the fourth software package P4, the fifth software package P5 and the sixth software package P6 are installed. In a fifth or highest basis level BL4 all software packages P1 to P8 of all abstraction levels L1 to L4 of the software product 10B are installed.

During the installation test procedure it is only possible to install software packages of an abstraction level if all software packages of lower abstraction levels are already installed the software packages to install depend on.

The installation test procedure is started by creating a corresponding basis level BL0 to BL4 by installing all software packages of a corresponding installation state of the software product 10B.

In a first test cycle the test engine 130 creates the lowest basis level BL0 with no installed software packages P1 to P8 and checks the software package dependency and prerequisite information 142 for the software product 10B. In a first run of the first test cycle the test engine 130 tries to install the seventh software package P7 and the eighth software package P8 of the highest or fourth abstraction level L4. This should not be possible and lead to a helpful error which is output to the user, since no software packages of the preceding abstraction level L3 are installed. If it is possible to install one of the software packages P7, P8 of the highest or fourth abstraction level L4 this should lead to a real error output to the user and the test process is abandoned. In a second run of the first test cycle the test engine 130 tries to install the fifth software package P5 and the sixth software package P6 of the third abstraction level L3. This should not be possible and lead to a helpful error which is output to the user, since no software packages of the preceding abstraction level L2 are installed. If it is possible to install one of the software packages P5, P6 of the third abstraction level L3 this should lead to a real error output to the user and the test process is abandoned. In a third run of the first test cycle the test engine 130 tries to install the third software package P3 and the fourth software package P4 of the second abstraction level L2. This should not be possible and lead to a helpful error which is output to the user, since no software packages of the preceding abstraction level L1 are installed. If it is possible to install one of the software packages P3, P4 of the second abstraction level L3 this should lead to a real error output to the user and the test process is abandoned. In a fourth run of the first test cycle the test engine 130 tries to install all software packages P1, P2 of the lowest or first abstraction level L1 in different order. This means for example, that the test engine 130 first installs the first software package P1 and then the second software package P2. This should be possible, since the software packages P1, P2 have no dependencies. Then the test engine 130 removes all software packages P1, P2 and installs the second software package P2 and then the first software package P1. This should also be possible, since the software packages P1, P2 have no dependencies. If it is not possible to install the software packages P1, P2 of the lowest or first abstraction level L1 this should lead to a real error output to the user and the test process is abandoned. After the first test cycle all software packages are removed.

In a second test cycle the test engine 130 creates in a first step the first row of the subsequent basis level BL1 with partly installed software packages P1, P2 of the lowest abstraction level L1 and checks the software package dependency and prerequisite information 142 for the software product 10B. In the shown embodiment the test engine 130 installs the first software package P1 of the lowest or first abstraction level L1. In a first run the test engine 130 tries to install the seventh software package P7 and the eighth software package P8 of the highest or fourth abstraction level L4. This should not be possible and lead to a helpful error which is output to the user, since no software packages of the preceding abstraction level L3 are installed. If it is possible to install one of the software packages P7, P8 of the highest or fourth abstraction level L4 this should lead to a real error output to the user and the test process is abandoned. In a second run of the second test cycle the test engine 130 tries to install the fifth software package P5 and the sixth software package P6 of the third abstraction level L3. This should not be possible and lead to a helpful error which is output to the user, since no software packages of the preceding abstraction level L2 are installed. If it is possible to install one of the software packages P5, P6 of the third abstraction level L3 this should lead to a real error output to the user and the test process is abandoned. In a third run of the second test cycle the test engine 130 tries to install all software packages P3, P4 of the second abstraction level L2 in different order. This means for example, that the test engine 130 first installs the third software package P3 and then the fourth software package P4. A successful installation depends on the software package dependency and prerequisite information 142. In the shown embodiment this should not be possible, since the software packages P3, P4 of the second abstraction level L2 depend on both software packages P1, P2 of the lowest or first abstraction level L1. Then the test engine 130 removes all software packages P3, P4 and installs the fourth software package P4 and then the third software package P2. This should also be not possible, since the software packages P3, P4 of the second abstraction level L2 depend on both software packages P1, P2 of the lowest or first abstraction level L1. If it is possible to install the software packages P3, P4 of the second abstraction level L2 this should lead to a real error output to the user and the test process is abandoned. After the first step of second test cycle all software packages are removed.

The test engine 130 performs the second test cycle for the subsequent basis level BL1 with partly installed software packages P1, P2 of the lowest abstraction level L1 for all possible permutations of the software packages P1, P2 of the lowest abstraction level L1. Therefore the test engine 130 creates in a second step of the second test cycle the second row of the subsequent basis level BL1 with partly installed software packages P1, P2 of the lowest abstraction level L1 and checks the software package dependency and prerequisite information 142 for the software product 10B. In the shown embodiment the test engine 130 installs the second software package P2 of the lowest or first abstraction level L1. Then the test engine 130 repeats the above described runs of the first step of the second test cycle with the installed second software package P2. The results should be the same as in the first step of the second test cycle. So it should not be possible to install one of the software packages P3 to P8 and this should lead to a helpful error which is output to the user. If it is possible to install one of the software packages P3 to P8 this should lead to a real error output to the user and the test process is abandoned. After the second step of second test cycle all software packages are removed.

In a third step of the second test cycle the test engine 130 creates the third row of the subsequent basis level BL1 with both software packages P1, P2 of the lowest abstraction level L1 installed and checks the software package dependency and prerequisite information 142 for the software product 10B. Then the test engine 130 repeats the above described runs of the first or second test cycle with both installed software packages P1, P2. The results for the software packages P5 to P8 of the third abstraction level L3 and the fourth abstraction level L4 should be the same as in the first or second step of the second test cycle. So it should not be possible to install one of the software packages P5 to P8 and this should lead to a helpful error which is output to the user. If it is possible to install one of the software packages P5 to P8 this should lead to a real error output to the user and the test process is abandoned. In difference to the first and second step of the second test cycle it should be possible in the third step of the second test cycle to install the software packages P3, P4 of the second abstraction level L2 in any order, since all software packages P1, P2 of the preceding abstraction level L1 are installed the software packages P3, P4 of the second abstraction level L2 depend on. If it is not possible to install the software packages P3, P4 this should lead to a real error output to the user and the test process is abandoned. After the third step of second test cycle all software packages are removed.

The test engine 130 performs corresponding test cycles for each basis level BL0 to BL3 shown in the installation basis level matrix 122B_IN of FIG. 10. Therefore the test engine 130 performs a third test cycle for the third basis level BL2 with all possible permutations of the software packages P3, P4 of the second abstraction level L2, and a fourth test cycle for the fourth basis level BL3 with all possible permutations of the software packages P6, P7 of the third abstraction level L3.

In the installation basis level matrix 122B_IN based on the exemplary second software product 10B only 64 test combinations are to be tested. Theoretically 40320 combinations for eight software packages have to be tested. Therefore embodiments of the present invention reduce the amount of tests dramatically.

Referring to FIG. 11 the de-installation basis level matrix 122B_DE comprises also one column for each abstraction level L1 to L4 (L(M)) and one row for each base level BL0 to BL4 (BL(M)). In a lowest or first basis level BL0 no software packages P1 to P8 of the software product 10B are installed. In the second basis level BL all software packages P1, P2 of the lowest or first abstraction level L1 are installed. In the third basis level BL2 all software packages P1, P2 from the lowest or first abstraction level L1 and all software package P3, P4 of the second abstraction level L2 are installed. In a fourth basis level BL3 all software packages P1, P2 from the lowest or first abstraction level L1 and all software packages P3, P4 from the second abstraction level L2 and all software packages P5, P6 of the third abstraction level L3 are installed. In a fifth or highest basis level BL4 all software packages P1 to P8 of all abstraction levels L1 to L4 of the software product 10B are installed.

During the de-installation test procedure it is only possible to de-install software packages of an abstraction level if all software packages of higher abstraction levels are already de-installed.

The de-installation test procedure is started by creating a corresponding basis level BL0 to BL4 by installing all software packages of a corresponding installation state of the software product 10B.

In a first test cycle the test engine 130 creates in a first step the highest or fifth basis level BL4 with all installed software packages P1 to P8. In a first run of the first test cycle the test engine 130 tries to de-install the first software package P1 and the second software package P2 of the lowest or first abstraction level L1. This should not be possible and lead to a helpful error which is output to the user, since not all software packages of the subsequent abstraction level L2 are de-installed. If it is possible to de-install one of the software packages P1, P2 of the lowest or first abstraction level L1 this should lead to a real error output to the user and the test process is abandoned. In a second run of the first test cycle the test engine 130 tries to de-install the third software package P3 and the fourth software package P4 of the second abstraction level L2. This should also not be possible and lead to a helpful error which is output to the user, since not all software packages of the subsequent abstraction level L3 are de-installed. If it is possible to de-install one of the software packages P3, P4 of the second abstraction level L2 this should lead to a real error output to the user and the test process is abandoned. In a third run of the first test cycle the test engine 130 tries to de-install the fifth software package P5 and the sixth software package P6 of the third abstraction level L3. This should not be possible and lead to a helpful error which is output to the user, since not all software packages of the subsequent abstraction level L4 are de-installed. If it is possible to de-install one of the software packages P5, P6 of the third abstraction level L3 this should lead to a real error output to the user and the test process is abandoned. In a fourth run of the first test cycle the test engine 130 tries to de-install all software packages P7, P8 of the highest or fourth abstraction level L4 in different order. This means for example, that the test engine 130 first de-installs the seventh software package P7 and then the eighth software package P8. This should be possible, since there is no subsequent abstraction level. Then the test engine 130 installs all software packages P1 to P8 and tries to de-install the eighth software package P8 and then the seventh software package P7. This should also be possible, since there is no subsequent abstraction level. If it is not possible to de-install the software packages P7, P8 of the highest or fourth abstraction level L4 this should lead to a real error output to the user and the test process is abandoned. After the first test cycle all software packages are removed.

In a second test cycle the test engine 130 creates in a first step the previous basis level BL3 with all installed software packages P1 to P6 of the first abstraction level L1, second abstraction level L2, and third abstraction level L3. In a first run of the second test cycle the test engine 130 tries to de-install the first software package P1 and the second software package P2 of the lowest or first abstraction level L1. This should not be possible and lead to a helpful error which is output to the user, since not all software packages of the subsequent abstraction level L2 are de-installed. If it is possible to de-install one of the software packages P1, P2 of the lowest or first abstraction level L1 this should lead to a real error output to the user and the test process is abandoned. In a second run of the second test cycle the test engine 130 tries to de-install the third software package P3 and the fourth software package P4 of the second abstraction level L2. This should also not be possible and lead to a helpful error which is output to the user, since not all software packages of the subsequent abstraction level L3 are de-installed. If it is possible to de-install one of the software packages P3, P4 of the second abstraction level L2 this should lead to a real error output to the user and the test process is abandoned. In a third run of the second test cycle the test engine 130 tries to de-install the all software packages P5, P6 of the third abstraction level L3 in different order. This means for example, that the test engine 130 first de-installs the fifth software package P5 and then the sixth software package P6. This should be possible, since all software packages P7. P8 of the subsequent abstraction level L4 are already de-installed. Then the test engine 130 installs all software packages P1 to P6 of the fourth basis level BL3 and tries to de-install the sixth software package P6 and then the fifth software package P5. This should also be possible, since all software packages P7, P8 of the subsequent abstraction level L4 are already de-installed. If it is not possible to de-install the software packages P5, P6 of the third abstraction level L3 this should lead to a real error output to the user and the test process is abandoned. After the second test cycle all software packages are removed.

The test engine 130 performs corresponding test cycles for each basis level BL1 to BL2 shown in the de-installation basis level matrix 122B_DE of FIG. 11. Therefore the test engine 130 performs a third test cycle for the third basis level BL2 with all installed software packages P1 to P4 of the first abstraction level L1 and the second abstraction level L2, and a fourth test cycle for the second basis level BL1 with all installed software packages P1, P2 of the first abstraction level L1.

Figure 12:
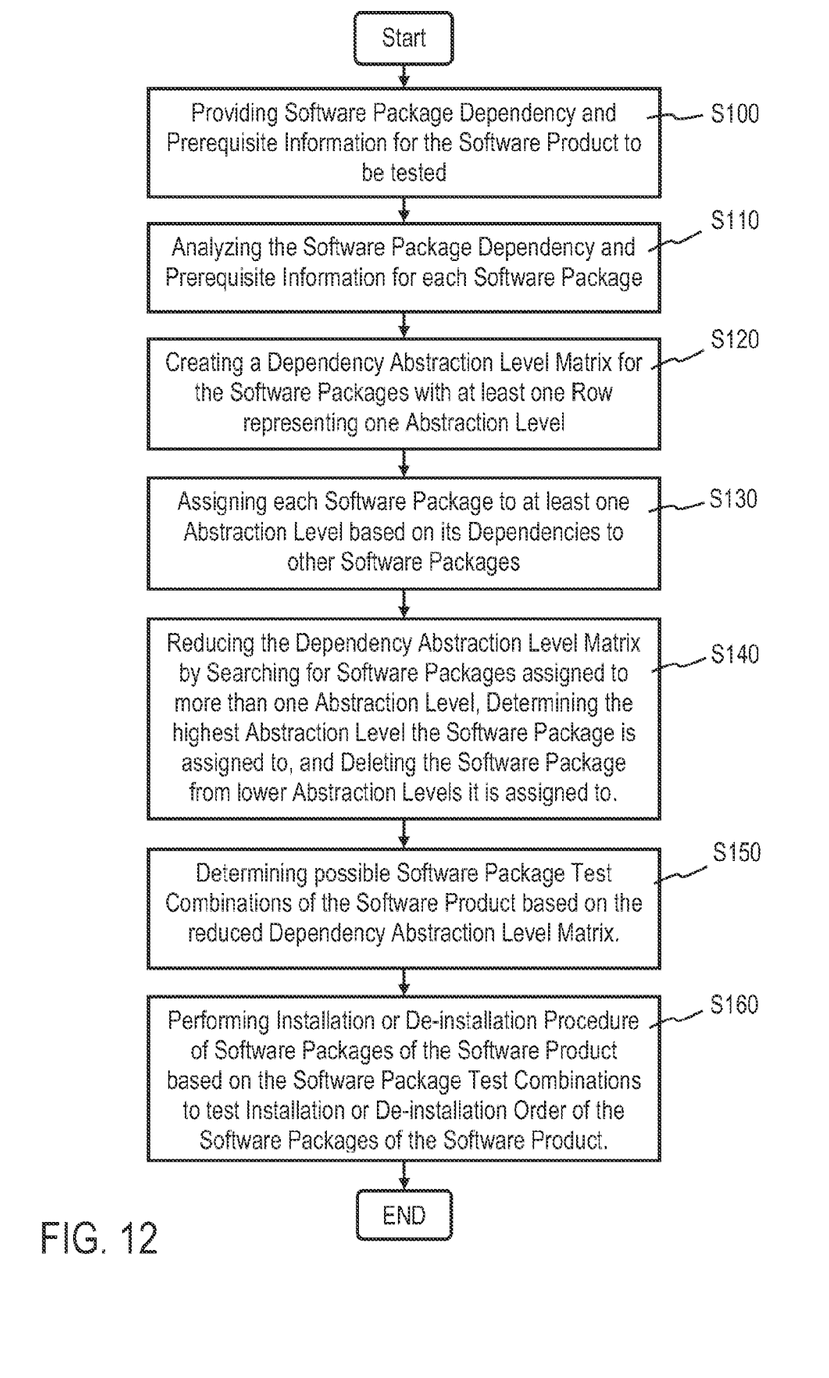
FIG. 12 is a schematic flow diagram of a method for automatic testing a software product, in accordance with an embodiment of the present invention.

FIG. 12 shows a method for automatic testing a software product comprising a plurality of software packages, which are to be installed or de-installed in defined order, in accordance with an embodiment of the present invention.

Referring to FIG. 12 step S100 provides software package dependency and prerequisite information 142 for said software product 10. Step S110 analyzes the software package dependency and prerequisite information for each software package P1 to P(Z) and step S120 creates a dependency abstraction level matrix 112 for the software packages P1 to P(Z) with at least one row representing one abstraction level L1 to L(M). Step S130 assigns each software package P1 to P(Z) to at least one abstraction level L1 to L(M) based on its dependencies to other software packages. Step S140 reduces the dependency abstraction level matrix 112 by searching for software packages assigned to more than one abstraction level, determines the highest abstraction level the software package is assigned to, and deletes the software package from lower abstraction levels it is assigned to. Step S150 determines possible software package test combinations of the software product 10 based on the reduced dependency abstraction level matrix 112. Step S160 performs installation or de-installation procedure of software packages P1 to P(Z) of the software product 10 based on the software package test combinations to test installation or de-installation order of the software packages P1 to P(Z) of the software product 10.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method in a data processing system, for automatic testing a software product comprising a plurality of software packages (P1, ..., P(Z)) that are to be installed or de-installed in defined order, the method comprising:
   providing software package dependency and prerequisite information for the software product;
   analyzing the software package dependency and prerequisite information for each software package in the plurality of software packages (P1, ..., P(Z)) and creating a dependency abstraction level matrix for the plurality of software packages (P1, ..., P(Z)) with at least one row representing one abstraction level (L1, ..., L(M));
   assigning each software package in the plurality of software packages (P1, ..., P(Z)) to at least one abstraction level (L1, ..., L(M)) based on the software package's dependencies to other software packages in the plurality of software packages (P1, ..., P(Z)), wherein, in the dependency abstraction level matrix, each abstraction level (L1, ..., L(M)) contains software packages that have no dependencies amongst themselves and depend on at least one other software package assigned to a previous abstraction level (L1, ..., L(M−1)), and wherein a lowest abstraction level (L1) contains software packages without any dependencies;
   reducing the dependency abstraction level matrix by searching for software packages assigned to more than one abstraction level, determining a highest abstraction level the software package is assigned to, and deleting the software package from lower abstraction levels that the software package is assigned to thereby forming a reduced dependency abstraction level matrix;
   determining possible software package test combinations of the software product based on the reduced dependency abstraction level matrix; and
   performing an installation procedure or a de-installation procedure of the plurality of software packages (P1, ..., P(Z)) of the software product on a computing device based on the software package test combinations to test installation or de-installation order of the plurality of software packages (P1, ..., P(Z)) of the software product, wherein, in a lowest basis level (BL0), none of the plurality of software packages (P1, ..., P(Z)) of the software product are installed, wherein, in a subsequent basis level (BL1), at least one software package of the lowest abstraction level (L1) is installed, and wherein, in an (N-th) basis level (BL(N)), all software packages from the lowest abstraction level (L1) to an ((N−1)-th) abstraction level (L(N−1)) and at least one software package of an (N-th) abstraction level (L(N)) are installed, with N={2, ..., (M)}, and, in a highest basis level (BL(M)), all of the plurality of software packages (P1, ..., P(Z)) of all abstraction levels (L1 ..., L(M)) of the software product are installed.

2. The method according to claim 1, wherein at least one basis level (BL0, ..., BL(M)) representing a current installation status of the software product is defined using the dependency abstraction level matrix.

3. The method according to claim 1, wherein, during said installation procedure, it is only possible to install software packages of an abstraction level (L2, ..., L(M)) if all software packages of lower abstraction levels (L1, ..., L(M−1)), which the software packages depend on, are already installed.

4. The method according to claim 3, wherein an installation test cycle or de-installation test cycle is started with creating a corresponding basis level (BL0, ..., BL(M)) by installing all of the plurality of software packages (P1, ..., P(Z)) of a corresponding installation state of the software product.

5. The method according to claim 4, wherein the installation procedure installs software packages of the abstraction levels (L1, ..., L(M)) in descending order starting with the software packages of the highest abstraction level (L(M)).

6. The method according to claim 4, wherein, to test an installation order, an installation basis level matrix comprising rows and columns is created based on the abstraction level matrix.

7. The method according to claim 6, wherein the installation basis level matrix comprises one column for each abstraction level (L1, ..., L(M)) and one row for a lowest base level (BL0), wherein numbers of rows of subsequent base levels (BL(N)) with N={1, ..., (M)} are defined by possible permutation of the plurality of software packages (P1, ..., P(Z)) of a corresponding abstraction level (L(N)), wherein the rows represent different software package test combinations.

8. The method according to claim 4, wherein the de-installation test procedure tries to de-install software packages (P1, ..., P(Z)) of the abstraction levels (L1, ..., L(M)) in ascending order starting with said software packages of the lowest abstraction level (L1).

9. The method according to claim 8, wherein, to test a de-installation order, a de-installation basis level matrix comprising rows and columns is created based on the abstraction level matrix, wherein the de-installation basis level matrix comprises one column for each abstraction level (L1, ..., L(M)) and one row for each base level (BL0, ..., BL(M)), wherein the rows represent different software package test combinations.

10. The method according to claim 1, wherein to test an installation or de-installation order all software package test combinations of an installation basis level matrix or a de-installation basis level matrix is tested and results are compared with the software package dependency and prerequisite information.

11. A computer program product comprising a non-transitory computer-readable storage medium having a computer-readable program stored therein, wherein the computer-readable program, when executed on a computer, causes the computer to:

provide software package dependency and prerequisite information for a software product;

analyze the software package dependency and prerequisite information for each software package in a plurality of software packages (P1, ..., P(Z)) in the software product and create a dependency abstraction level matrix for the plurality of software packages (P1, ..., P(Z)) with at least one row representing one abstraction level (L1, ..., L(M));

assign each software package in the plurality of software packages (P1, ..., P(Z)) to at least one abstraction level (L1, ..., L(M)) based on the software package's dependencies to other software packages in the plurality of software packages (P1, ..., P(Z)), wherein in the dependency abstraction level matrix each abstraction level (L1, ..., L(M)) contains software packages that have no dependencies amongst themselves and depend on at least one other software package assigned to a previous abstraction level (L1, ..., L(M−1)), and wherein a lowest abstraction level (L1) contains software packages without any dependencies;

reduce the dependency abstraction level matrix by searching for software packages assigned to more than one abstraction level, determining a highest abstraction level the software package is assigned to, and deleting the software package from lower abstraction levels that the software package is assigned to thereby forming a reduced dependency abstraction level matrix;

determine possible software package test combinations of the software product based on the reduced dependency abstraction level matrix; and perform an installation procedure or a de-installation procedure of the plurality of software packages (P1, ..., P(Z)) of the software product on a computing device based on the software package test combinations to test installation or de-installation order of the plurality of software packages (P1, ..., P(Z)) of the software product, wherein, in a lowest basis level (BL0), none of the plurality of software packages (P1, ..., P(Z)) of the software product are installed, wherein, in a subsequent basis level (BL1), at least one software package of the lowest abstraction level (L1) is installed, and wherein, in an (N-th) basis level (BL(N)), all software packages from the lowest abstraction level (L1) to an ((N−1)-th) abstraction level (L(N−1)) and at least one software package of an (N-th) abstraction level (L(N)) are installed, with N={2, ..., (M)}, and, in a highest basis level (BL(M)), all of the plurality of software packages (P1, ..., P(Z)) of all abstraction levels (L1, ..., L(M)) of the software product are installed.

12. The computer program product according to claim 11, wherein at least one basis level (BL0, ..., BL(M)) representing a current installation status of the software product is defined using the dependency abstraction level matrix.

13. The computer program product according to claim 11, wherein, during said installation procedure, it is only possible to install software packages of an abstraction level (L2, ..., L(M)) if all software packages of lower abstraction levels (L1, ..., L(M−1)), which the software packages depend on, are already installed.

14. The computer program product according to claim 13, wherein an installation test cycle or de-installation test cycle is started with creating a corresponding basis level (BL0, ..., BL(M)) by installing all of the plurality of software packages (P1, ..., P(Z)) of a corresponding installation state of the software product.

15. The computer program product according to claim 14, wherein the installation procedure installs software packages of the abstraction levels (L1, ..., L(M)) in descending order starting with the software packages of the highest abstraction level (L(M)).

16. The computer program product according to claim 14, wherein, to test an installation order, an installation basis level matrix comprising rows and columns is created based on the abstraction level matrix.

17. The computer program product according to claim 14, wherein the de-installation test procedure tries to de-install software packages (P1, ..., P(Z)) of the abstraction levels (L1, ..., L(M)) in ascending order starting with said software packages of the lowest abstraction level (L1).

18. An apparatus comprising:
a processor; and
a memory coupled to the processor, wherein the memory comprises instructions which, when executed by the processor, cause the processor to:

provide software package dependency and prerequisite information for a software product;

analyze the software package dependency and prerequisite information for each software package in a plurality of software packages (P1, ..., P(Z)) in the software product and create a dependency abstraction level matrix for the plurality of software packages (P1, ..., P(Z)) with at least one row representing one abstraction level (L1, ..., L(M));

assign each software package in the plurality of software packages (P1, ..., P(Z)) to at least one abstraction level (L1, ..., L(M)) based on the software package's dependencies to other software packages in the plurality of software packages (P1, ..., P(Z)), wherein in the dependency abstraction level matrix each abstraction level (L1, ..., L(M)) contains software packages that have no dependencies amongst themselves and depend on at least one other software package assigned to a previous abstraction level (L1, ..., L(M−1)), and wherein a lowest abstraction level (L1) contains software packages without any dependencies;

reduce the dependency abstraction level matrix by searching for software packages assigned to more than one abstraction level, determining a highest abstraction level the software package is assigned to, and deleting the software package from lower abstraction levels that the software package is assigned to thereby forming a reduced dependency abstraction level matrix;

determine possible software package test combinations of the software product based on the reduced dependency abstraction level matrix; and perform an installation procedure or a de-installation procedure of the plurality of software packages (P1, ..., P(Z)) of the software product on a computing device based on the software package test combinations to test installation or de-installation order of the plurality of software packages (P1, ..., P(Z)) of the software product, wherein, in a lowest basis level (BL0), none of the plurality of software packers (P1, ..., P(Z)) of the software product are installed, wherein, in a subsequent basis level (BL1), at least one software package of the lowest abstraction level (L1) is installed, and wherein, in an (N-th) basis level (BL(N)), all software packages from the lowest abstraction level (L1) to an ((N−1)-th) abstraction level (L(N−1)) and at least one software package of an (N-th) abstraction level (L(N)) are installed, with N={2, ..., (M)}, and, in a highest basis level (BL(M)), all of the plurality of software packages (P1, ..., P(Z)) of all abstraction levels (L1, ..., L(M)) of the software product are installed.

\* \* \* \* \*